United States Patent [19]

Swihart et al.

[11] Patent Number: 4,830,925

[45] Date of Patent: May 16, 1989

[54] CATHODIC PROTECTION METHOD AND COMPOSITIONS

[75] Inventors: Terence J. Swihart, Essexville; John D. Blizzard, Bay City, both of Mich.

[73] Assignee: Dow Corning Corporation, Midland, Mich.

[21] Appl. No.: 140,372

[22] Filed: Jan. 4, 1988

[51] Int. Cl.⁴ .............................................. B32B 9/06
[52] U.S. Cl. ..................................... 428/450; 427/58; 427/387; 427/388.1; 528/14; 528/15; 528/18; 528/19; 525/475; 525/477; 525/478
[58] Field of Search ................... 525/477, 475, 478; 528/18, 19, 15, 14; 427/58, 387, 388.1; 428/450

[56] References Cited

U.S. PATENT DOCUMENTS

| | | | |
|---|---|---|---|
| 4,322,518 | 3/1982 | Blizzard | 528/15 |
| 4,472,231 | 9/1984 | Jenkins | 156/307.5 |
| 4,537,829 | 8/1985 | Blizzard et al. | 428/429 |
| 4,631,299 | 12/1986 | Laisney et al. | 528/31 |
| 4,701,380 | 10/1987 | Narula et al. | 428/447 |

*Primary Examiner*—Melvyn I. Marquis
*Attorney, Agent, or Firm*—Alexander Weitz

[57] ABSTRACT

A method for the cathodic protection of a metal object is disclosed. The object is coated with a resin-containing curable silicone composition which contains a minor portion of a triorganosiloxy endblocked diorganopolysiloxane. After the silicone composition is cured, the object is maintained at a negative potential relative to an electrically conductive environment by a current source means. The compositions of the present invention have been found to exhibit significant improvement with respect to cathodic disbondment relative to similar silicone compositions of the prior art.

47 Claims, No Drawings

CATHODIC PROTECTION METHOD AND COMPOSITIONS

The present invention relates to a method for corrosion protection of a metal object which is placed in an electrically conductive environment. More particularly, the present invention relates to a method of coating the metal object with a liquid silicone composition, curing the composition, and maintaining the metal object at a negative electrical potential relative to its surroundings, thereby protecting the metal object from electrochemical corrosion.

BACKGROUND OF THE INVENTION

One of the most deleterious forms of corrosion of metal structures occurs when these structures are exposed to the electrolytic action of a conductive environment. While not wishing to be bound by any particular theory, it is believed that this "electrochemical corrosion" results from the flow of current from one area of the metal structure (anodic area), through the conductive environment, to another area on the same structure (cathodic area), thereby completing the circuit of a miniature electrolytic cell. At the anodic areas, the metal is oxidized to a positive valence state and leaves the surface in ionic form, ultimately leading to pitting and other forms of gross degradation of the metal. Electrochemical corrosion is generally encountered when such metal structures as tanks and pipelines are buried in the ground or when such structures as ship hulls and off-shore platforms are submerged in sea water. In order to limit corrosive effects under these circumstances, methods for cathodic protection of metal structures have been developed which rely on an external current source or a "sacrificial" anode to impose a negative electrical potential on the metal structure relative to its surroundings. This is believed to effectively turn the whole structure into a cathode, thereby reducing, or eliminating, current flow from the structure to the conductive environment, and thus the corrosion associated therewith.

The above described methods of cathodic protection may be enhanced by coating the metal with an organic film or tape. Thus, for example, in U.S. Pat. No. 4,472,231 to Jenkins, anticorrosion pipewrap system is described wherein a pipe is first coated with a primer based on natural rubber. The coated pipe is then overlaid with an adhesive-coated polyolefin tape, the adhesive comprising a butyl-based rubber, tackifying agent and a cross-linking agent. In addition to providing corrosion protection to the pipes wrapped with the tape, minimal creep of the protective coating composite is obtained in high shear stress environments (i.e., when the pipe is implated inground).

Various silicone compositions have also been utilized as corrosion protective coatings, although not specifically in the area of cathodic protection. In U.S. Pat. No. 4,322,518, assigned to the assignee of the present invention and hereby incorporated by reference, Blizzard discloses silicone coating compositions which comprise a solventless liquid copolymeric organopolysiloxane comprising a curable silicone polymer fluid or gum and a liquid $SiO_2$-based resin as the sole curing agent for the fluid or gum. When cured on various substrates, these silicone compositions provide release coatings having controllable release forces for adhesives adhered thereto. A variation on the compositions taught by Blizzard, cited supra, was shown to provide corrosion resistance to ferrous metals which are exposed to moisture and/or salt by Narula et al. in U.S. Pat No. 4,701,380, assigned to the assignee of present invention. In this disclosure, an orgranosilane is added to the above mentioned silicone coating composition in order to improve its adhesion to substrates when cured at room temperature as well as to provide improved corrosion protection.

Blizzard and Swihart, in U.S. Pat. No. 4,537,829, also assigned to the assignee of the present invention and hereby incorporated by reference, teach compositions similar to those described by Blizzard, cited supra. In addition to the curable silicone polymer and liquid $SiO_2$-based resin, these compositions further comprise an organosilicon resin consisting essentially of dimethylvinylsiloxy units, trimethylsiloxy units and $SiO_{4/2}$ units and a hydrosilylation catalyst. These compositions, when cured, are said to provide improved resistance to fuels and a high degree of corrosion protection to metal substrates.

SUMMARY OF THE INVENTION

It has now been found that certain compositions prepared according to the disclosures of Blizzard, and Blizzard and Swihart, both cited supra, provide improved cathodic protection to metals, particularly ferrous metals, when cured on the surfaces thereof. It has surprisingly been discovered that this protection is significantly enhanced when the compositions further comprise a minor portion of a triorganosiloxy endblocked diorganopolysiloxane fluid. The present invention therefore relates to a method for the cathodic protection of a metal object, wherein said metal object is maintained at a negative electrical potential relative to an electrically conductive environment by a current source means, the improvement comprising coating at least one surface of said metal object with a silicone composition selected from a composition (i) comprising (A) a liquid copolymeric organopolysiloxane which is selected from a reaction product or a blend of (a) a resinous copolymeric siloxane consisting essentially of $R_3SiO_{\frac{1}{2}}$ siloxane units and $SiO_{4/2}$ siloxane units wherein the ratio of said $R_3SiO_{\frac{1}{2}}$ units to said $SiO_{4/2}$ units has a value of 0.6:1 to 0.9:1 and each R is independently selected from a monovalent hydrocarbon radical or a monovalent halohydrocarbon radical and (b) a liquid organohydrogenpolysiloxane;

(B) a diorganopolysiloxane having the average formula

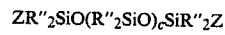

$$ZR''_2SiO(R''_2SiO)_cSiR''_2Z$$

wherein Z is selected from a silicon-bonded hydroxyl radical or an R'' radical, R'' is a monovalent hydrocarbon radical, with the proviso that at least two R'' radicals are vinyl radicals when Z is R'', and c has an average value sufficient to provide a viscosity of about 10 to 300,000 Poise at 25° C. for the diorganopolysiloxane;

(C) a triorganosiloxy endblocked diorganopolysiloxane having the general formula $R_3SiO(R_2SiO)_dSiR_3$, wherein R has its previously defined meaning and d has an average value sufficient to provide a viscosity of about 0.01 to 10,000 Poise at 25° C. for the triorganosiloxy endblocked diorganopolysiloxane; and (D) a pure agent, or a composition (ii) comprising
(A) said liquid copolymeric organopolysiloxane;
(B) said diorganopolysiloxane;

(C) said triorganosiloxy endblocked diorganopolysiloxane;

(E) an organosilicon resin consisting essentially of Me$_2$ViSiO$_{\frac{1}{2}}$ units, Me$_3$SiO$_{\frac{1}{2}}$ units and SiO$_{4/2}$ units, wherein Me denotes the methyl radical, said units being in a ratio of Me$_2$ViSiO$_{\frac{1}{2}}$ units to Me$_3$SiO$_{\frac{1}{2}}$ units to SiO$_{4/2}$ units of from 0.10:0.6:1 to 0.25:0.9:1; and (F) a hydrosilylation catalyst, and curing said silicone composition to a non-flowing state.

This invention further relates to the compositions utilized in the above described method.

DETAILED DESCRIPTION OF THE INVENTION

In the method of the present invention, at least one surface of a metal object is coated with a silicone composition which is subsequently cured on the surface of the object. The metal object is then maintained at a negative electrical potential relative to an electrically conductive environment by a current source means, as commonly practiced in the art, to provide cathodic protection for the metal object from the ravages of electrochemical corrosion. The curable silicone compositions which may be advantageously employed in connection with this method for cathodic protection are based on the compositions disclosed by Blizzard in U.S. Pat. No. 4,322,518 and by Blizzard and Swihart in U.S. Pat. No. 4,537,829, both cited supra, to which a minor portion of a triorganosiloxy endblocked diorganopolysiloxane is added. These compositions are described further below.

The current source means contemplated herein may comprise an impressed current source, such as a battery, d.c. power supply, thermoelectric generator, fuel cell or solar cell, wherein the negative terminal of the impressed current source is placed in electrical contact with the metal object being protected. This type of current source means is generally employed in the cathodic protection of buried objects such as pipes, tanks and supporting structures, wherein the surrounding soil is connected to the positive terminal of the impressed current source. In a preferred embodiment, the present method utilizes the curable silicone compositions, described infra, to coat steel or iron pipes which are buried in the ground and protected from electrochemical corrosion by an impressed current source.

Alternatively, the current source means may comprise a galvanic (sacrificial) anode having an electrolytic potential which is greater than that of the metal object being protected. In this case, the anode is electrically connected to the metal object and is also in contact with the conductive environment which surrounds the metal object. The metal object thus becomes negatively charged with respect to the conductive environment and is thereby protected at the expense of the anode, the latter being corroded by electrochemical action. The use of sacrificial anodes may again be employed in the protection of metal objects which are buried in the ground. This current source means also finds great utility in the protection of metal objects which are submerged in rivers, lakes or oceans, such as the hulls of ships and undersea pipelines, as well as various structures such as pier footings, bridge pilings and off-shore platforms. When the metal object being protected is steel or iron, effective anode materials may be selected from aluminum, magnesium or zinc, preferably magnesium.

The various current source means, and their utility in the cathodic protection of metal structures which are exposed to electrochemical corrosion, are well known in the art. For example, the interested reader is referred to Chapter 9 of *Corrosion Basics* (National Association of Corrosion Engineers, Houston, Tex., 1984) for greater detail. Although most of these applications deal with the protection of ferrous metals (i.e., iron and steel), it will be recognized by those skilled in the art that the method described herein is generally applicable to other metals which may require cathodic protection, such as aluminum.

The compositions of the present invention, described infra, may be applied as 100% solids, or from solution, and cured on the surface of the metal object. Typically, the compositions are diluted with a sufficient quantity of a good solvent in order to provide a desired coating composition viscosity. Such solvents as hexane, heptane, toluene, xylene, mineral spirits or ketones are suitable for this purpose, xylene being preferred. Alternatively, a 100% solids system is also contemplated herein, particularly when the coating composition has a low viscosity.

The compositions of this invention may be applied to metal surfaces by any of the methods commonly practiced in the coating arts. For example, substrates may be dipped, brushed, sprayed or flow coated. Optimal amounts of solvent and catalyst to be included in such coating compositions may readily be determined by routine experimentation.

After coating of the metal substrates with the coating compositions of this invention, the coatings, which typically are at least about 1 mil in thickness, are cured, preferably at elevated temperatures such as 30° to 200° C. Alternatively, when sufficient catalyst is used, the compositions of the present invention can be cured at room temperature.

Composition (i)

A first composition which may be used in the method of the present invention comprises (A) a liquid copolymeric organopolysiloxane, (B) a diorganopolysiloxane, (C) triorganosiloxy endblocked diorganopolysiloxane and (D) a cure agent capable of converting the total composition to a non-flowing state.

The liquid copolymeric organopolysiloxane (A) of this invention is preferably prepared by reacting (a) a resinous copolymeric siloxane with (b) a liquid organohydrogenpolysiloxane at an acid number greater than zero, as taught by Blizzard in U.S. Pat. No. 4,322,518, cited supra. The liquid copolymeric organopolysiloxane contains silicon-bonded hydroxyl radicals and/or silicon-bonded hydrogen radicals which provide chemical reactivity therefor in the compositions of this invention.

Ingredient (a) that is used to prepare the liquid copolymeric organopolysiloxane is an organic solvent solution of a resinous copolymeric siloxane which consists essentially of R$_3$SiO$_{\frac{1}{2}}$ siloxane units and SiO$_{4/2}$ siloxane units in a molar ratio which provides from 0.6 to 0.9 R$_3$SiO$_{\frac{1}{2}}$ units for every SiO$_{4/2}$ unit. Each R independently denotes a monovalent hydrocarbon radical such as an alkyl radical, such as methyl, ethyl, isopropyl, butyl and hexyl; an aryl radical, such as phenyl, tolyl and xylyl; an arylalkyl radical, such as beta-phenylethyl and beta-phenylpropyl; a cycloaliphatic radical, such as cyclopentyl, and cyclohexyl or a haloalkyl radical, such as trifluoropropyl. Preferably all R radicals in ingredient (a) are lower alkyl radicals, although a minor portion of them can be replaced with other monovalent hydrocarbon radicals such as the vinyl radical and/or the phenyl radical to provide additional properties for the resinous copolymer, such as the reactivity attendant therewith. It is preferred that the resinous copolymeric siloxane portion of ingredient (a) consists essentially of $(CH_3)_3SiO_{\frac{1}{2}}$ siloxane units and $SiO_{4/2}$ siloxane units, in the molar ratio of about 0.75:1.

Ingredient (b) that is used to prepare the liquid copolymeric organopolysiloxane is any liquid organohydrogenpolysiloxane containing an average of at least one silicon-bonded hydrogen radical per molecule, and can have a linear, cyclic or branched structure or combinations thereof. Thus, ingredient (b) has the unit formula $R_mH_nSiO_{(4-m-n)/2}$ wherein m and n denote positive numbers whose sum is less than 4, preferably from 1.9 to 2.1. The organic radicals R in ingredient (b) can be any of the R radicals denoted above. Preferably, although not necessarily, the organic radicals R in ingredient (b) are the same as the organic radicals R in ingredient (a).

Specific examples of ingredient (b) of the present invention include $(CH_3)_3SiO[(G)(H)SiO]_ySi(CH_3)_3$, in which G is the trifluoropropyl radical and y is about 30 to 70;

$H(CH_3)_2SiO[(CH_3)(H)SiO]_ySi(CH_3)_2H$;

and $[(CH_3)HSiO]_x$, in which x has a value of about 3 to 7.

An organohydrogenpolysiloxane having the formula $(CH_3)_3SiO[(CH_3)(H)SiO]_bSi(CH_3)_3$, wherein b has an average value of from 30 to 70, is a highly preferred ingredient (b). It is particularly preferred that b is about 35.

The preparation of the above liquid copolymeric organopolysiloxane reaction product is described in detail in U.S. Pat. No. 4,322,518, cited supra. Briefly stated, ingredients (a) and (b) are mixed, preferably at an acid number between 0.1 and 1, and heated to remove the solvent contained in ingredient (a).

Alternatively, component (A) of the present invention may consist essentially of a blend of ingredients (a) and (b) which is formed at room temperature. Such a homogeneous mixture may be employed directly in the compositions of the present invention. As in the case of the above reaction product, an acid number greater than zero is required and an acid number between about 0.1 and 1, on a solids basis, is preferred.

On a solids basis, the organohydrogenpolysiloxane (i.e., ingredient (b)) content of component (A) varies between about 10 and 90 weight percent of the reaction product or room temperature blend. Preferably, the organohydrogenpolysiloxane content of component (A) varies between about 40 and 60 weight percent and most preferably it is about 50 weight percent on a solids basis. Herein, the term "solids basis" denotes the non-solvent content of any composition or ingredient.

Component (B) of this invention is a diorganopolysiloxane having the general formula $ZR''_2SiO(R''_2SiO)_cSiR''_2Z$ wherein Z is a silicon-bonded hydroxyl radical or an R'' radical. Each R'' denotes a monovalent hydrocarbon radical selected from the above defined R groups of component (A) with the proviso that, when Z is R'', at least two R'' groups of component (B) are vinyl radicals. Thus, components (B) comprises silicon-bonded hydroxyl radicals and/or vinyl radicals to provide reactive sites for curing the compositions of this invention. For the purpose of this invention, at least 95 percent of the R'' radicals of component (B) are methyl (hereinafter designated by Me) and it is preferred that all R'' radicals are methyl. Herein, c has an average value which is sufficient to provide a viscosity for component (B) of about 10 to 300,000 Poise at 25° C. This component is ordinarily dissolved in a solvent, such as toluene, xylene, naptha spirits, VMP naptha, low molecular weight ketones or hexane, before combining with the other components of this invention.

It is preferred that component (B) is a hydroxyl endblocked diorganopolysiloxane having the general formula $(HO)R''_2SiO(R''_2SiO)_cSiR''_2(OH)$ wherein R'' and c have been previously defined. It is further preferred that R'' is again the methyl radical and that the viscosity of component (B) is about 200,000 Poise at 25° C.

Component (C) of the present invention is a triorganosiloxy endblocked diorganopolysiloxane having the general formula $R_3SiO(R_2SiO)_dSiR_3$ wherein R has its previously defined meaning and d has an average value such that the viscosity of the triorganosiloxy endblocked diorganopolysiloxane is between about 0.01 and 200,000 Poise at 25° C. It is again preferred that all the R groups are methyl. Most preferably, component (C) has a viscosity in the range 0.05 to 300 Poise at 25° C. These fluids are well known in the art and are available commercially.

The cure agent (Component D) for composition (i) of the present invention may be selected from any of the compounds which are known to facilitate the condensation reactions between SiOH groups and between SiOH and SiH groups. Compounds known to facilitate the reaction between SiH groups in the presence of trace quantities of water may also be used for this purpose. For example, the compounds contemplated may be metal salts of carboxylic acids. Metals such as Pb, Zn, Sb, Fe, Cd, Sn, Ba, Ca and Mn are known to be effective in this regard, particularly the naphthanates, octoates, hexoates, laurates and acetates. Preferred salts are dibutyltin diacetate, dibutyltin dilaurate and stannous octoate, particularly the dibutyltin diacetate. These catalysts, and their use in promoting the above-mentioned reactions, are well known in the art.

The cure agent may also be selected from well known hydrosilylation catalysts, such as platinum and rhodium compounds, particularly when component (B) contains vinyl functionality. Platinum catalysts, such as platinum acetylacetonate or chloroplatinic acid are representative of these compounds and suitable for use as the cure agent (D). Again, such compounds, and their utility in promoting the above reactions, are well known in the art. A preferred cure agent of this type is a mixture of a chloroplatinic acid complex of divinyltetramethyldisiloxane diluted in dimethylvinylsiloxy endblocked polydimethylsiloxane which may be prepared according to methods described by Willing in U.S. Pat. No. 3,419,593. Most preferably, this mixture contains about 0.65 weight percent platinum.

Composition (i) of this invention is prepared by thoroughly mixing, on a solids basis, from about 5 to 300 parts by weight, preferably from 50 to 150 parts, of component (A), about 100 parts by weight of component (B), about 1 to 100 parts by weight, preferably from 1 to 25 parts, of component (C) and sufficient cure agent (D) to crosslink the mixture to a non-flowing state. Cure agent is generally added just before the compositions are to be used (cured). In this connection, it has been found that even when the compositions are not catalyzed they should not be allowed to age for long periods before using.

Particularly preferred embodiments of the present invention result when ingredient (A) is a liquid copolymeric organopolysiloxane wherein the resinous copolymeric siloxane portion of ingredient (a), consisting essentially of $(CH_3)_3SiO_{\frac{1}{2}}$ siloxane units and $SiO_{4/2}$ siloxane units in the molar ratio of about 0.75:1, is reacted with ingredient (b), consisting essentially of $(CH_3)_3SiO[(CH_3)(H)SiO]_bSi(CH_3)_3$ in which b is about 35, the ratio of (a) to (b) being about 1:1 on a solids weight basis. Thus, in highly preferred compositions of the present invention, about 43 parts by weight of this preferred liquid copolymeric organopolysiloxane is mixed with about 100 parts by weight of a hydroxyl endblocked dimethylpolysiloxane having a viscosity of about 200,000 Poise at 25° C. and from about 1 to 36, preferably about 2, parts by weight of a trimethylsiloxy endblocked polydimethylsiloxane fluid having a viscosity between about 350 and 10,000 cS at 25° C. This mixture is catalyzed with about 4 parts by weight of dibutyltin diacetate.

Composition (ii)

A second composition which may be used in the method of the present invention is based on the curable silicone compositions disclosed by Blizzard and Swihart, cited supra. This composition comprises (A) the above mentioned liquid copolymeric organopolysiloxane reaction product or room temperature blend, (B) the above mentioned diorganopolysiloxane, (C) the above mentioned triorganosiloxy endblocked diorganopolysiloxane, (E) a vinyl-functional organosilicon resin and (F) a hydrosilylation catalyst capable of converting the total composition to a non-flowing state. This composition is similar to the above composition (i), but relies on the addition reaction between an SiH group and a vinyl radical (i.e., hydrosilylation) for its cure mechanism.

The components (A), (B) and (C) that are used to prepare the composition (ii) are the same as those described in the preparation of composition (i), discussed supra. The preferred embodiments of these components are also as described above, except that component (B) is now preferably a vinyl endblocked diorganopolysiloxane having the general formula

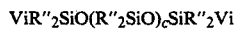

in which Vi hereinafter denotes the vinyl radical and wherein R″ and c have their previously defined meanings. It is further preferred that R″ is again the methyl radical and that the viscosity of component (B) is about 550 Poise at 25° C.

Component (E) of composition (ii) of the present invention is a vinyl-functional organosilicon resin consisting essentially of $Me_2ViSiO_{\frac{1}{2}}$ units, $Me_3SiO_{\frac{1}{2}}$ units and $SiO_{4/2}$ units in a ratio of 0.10:0.6:1 to 0.25/0.9/1, respectively. Preferably, this ratio is about 0.15:0.6:1. It is further preferred that this component is a water-immiscible organic solvent such as xylene, toluene and mixtures thereof.

Component (F) of composition (ii) of the present invention is a hydrosilylation catalyst and may be selected from the platinum or rhodium compounds described in connection with component (D), above. A preferred catalyst is the chloroplatinic acid complex of divinyltetramethyldisiloxane diluted in dimethylvinylsiloxy endblocked polydimethylsiloxane, described supra.

It is also preferred that a cure inhibitor, such as methyl butynol, and a cure promoter, such as methylvinylcyclopolysiloxane having from 3 to 7 siloxane units, be included in composition (ii) of the present invention.

Composition (ii) of this invention is prepared by thoroughly mixing, on a solids basis, from about 5 to 300 parts by weight, preferably from 50 to 150 parts, of component (A), about 100 parts by weight of component (B), about 1 to 100 parts by weight, preferably 2 to 20 parts, of component (C), from about 9 to 36 parts by weight of component (E) and sufficient hydrosilylation catalyst (F) to crosslink the mixture to the non-flowing state.

Particularly preferred embodiments of composition (ii) of the present invention result when about 61 parts by weight of the preferred liquid copolymeric organopolysiloxane reaction product (A), described above, is mixed with about 100 parts by weight of a vinyl endblocked dimethylpolysiloxane having a viscosity of about 550 Poise at 25° C. (B), about 22 parts by weight of an organosilicon resin consisting essentially of $Me_2ViSiO_{\frac{1}{2}}$ units, $Me_3SiO_{\frac{1}{2}}$ units and $SiO_{4/2}$ units in a ratio of about 0.15:0.6.1, respectively (E), from about 1 to 50 parts by weight of a trimethylsiloxy endblocked polydimethylsiloxane fluid having a viscosity between about 350 and 10,000 cS at 25° C. (C), about 0.18 parts by weight of methyl butynol, and about 1.8 parts by weight of a mixture of methylvinylcyclopolysiloxanes having 3 to 7 siloxane units. This mixture is catalyzed with about 1 part by weight of the above described platinum complex which contains about 0.65% by weight platinum, each component being measured on a solids basis.

Sufficient catalyst (component F) to allow cure of the composition to a non-flowing state is generally added just before the compositions are to be used (cured). In this connection, it has been found that even when the compositions are not catalyzed they should not be allowed to age for long periods before using.

Both types of compositions of the present invention can further comprise typical silicone adjuvants such as fillers, pigments, dyes and cure-control additives, if desired, as long as such adjuvants do not detract from the cathodic protection aspects of the cured coatings.

EXAMPLES

The following examples are presented to further illustrate the compositions of this invention, but are not to be construed as limiting the invention, which is delineated in the appended claims. All parts and percentages in the examples are on a weight basis unless indicated to the contrary and viscosities are measured at 25° C.

The following components were used to prepare the compositions of this invention.

FLUID I-A 70% xylene soluton of a siloxane resin copolymer consisting essentially of $(CH_3)_3SiO_{\frac{1}{2}}$ units and $SiO_2$ units in a molar ratio of approximately 0.75:1 (i.e., ingredient (a) of the present invention).

FLUID II-A liquid organohydrogenpolysiloxane having the average formula $$Me_3SiO(MeSiO)_{35}SiMe_3$$

wherein Me denotes the methyl radical (i.e., ingredient (b) of the present invention).

FLUID III-A liquid copolymeric organopolysiloxane was prepared according to the methods of U.S. Pat. No. 4,310,678, hereby incorporated by reference, wherein 59 parts of FLUID I was thoroughly mixed with 41 parts of FLUID II using a nitrogen purge. Xylene solvent was removed as this mixture was heated under a vacuum of about 100 mm Hg at 150° C. for 2 hours to yield a reaction product containing a 1:1 weight ratio of the siloxane resin copolymer to the liquid organohydrogenpolysiloxane (i.e., component A of the present invention).

FLUID IV-A 32% toluene solution of a silanol-ended dimethylpolysiloxane gum having a viscosity of about 200,000 Poise (component B).

FLUID V-A mixture consisting essentially of 82 percent of a dimethylvinylsiloxy endblocked polydimethylsiloxane (component B) having a viscosity of about 550 Poise at 25° C. and 18 percent of an organosilicon resin consisting essentially of $Me_2ViSiO_{\frac{1}{2}}$ units, $Me_3SiO_{\frac{1}{2}}$ units and $SiO_{4/2}$ units in a molar ratio of about 0.15/0.6/1, respectively (component E).

FLUID VI-A mixture of cyclic siloxanes having the formula $(MeViSiO)_x$, wherein Me denotes the methyl radical, Vi denotes the vinyl group and x is an integer between 3 and about 7.

DBTDA-Dibutyltin diacetate (component D).

PT-A chloroplatinic acid complex of divinyltetramethyldisiloxane diluted with dimethylvinylsiloxy endblocked polydimethylsiloxane to provide 0.65 weight percent platinum prepared according to Example 1 of U.S. Pat. No. 3,419,593 to Willing (component F).

Cathodic Disbondment Test

The compositions of the present invention were coated onto pre-cleaned, 16 gage, grit-blasted, cold-rolled steel panels and cured at 23° C. for 60 minutes plus 150° C. for 5 minutes, unless indicated to the contrary. A ½ inch diameter holiday (i.e., hole) was cut of the central portion of each cured coating. The resistance to electrochemical corrosion of the coated steel panels was determined by a cathodic disbondment test which was based on ASTM test method, G 8-79, as follows. A 2 inch (inner diameter) plastic cylinder was placed atop the coated steel panel such that the base of the cylinder was concentric with the holiday. The other perimeter of the cylinder was then sealed with respect to the surface of the coating using a methoxy-functional silicone room-temperature curing sealant such that the cylinder was capable of containing a conductive fluid. The cylinder was filled with a conductive fluid, a 3% salt solution (1% sodium chloride, 1% sodium carbonate and 1% sodium sulfate) in distilled water, and a platinum wire electrode was suspended in this solution. The platinum wire was connected to the positive terminal of a 1.5+/−0.1 volt power supply and the steel panel was similarly connected to the negative terminal of the power supply. Voltage was applied for 24 hours at a solution temperature of 23° C.

A similar procedure was followed wherein the temperature of the conductive fluid was maintained at 60° C. by placing the panel and cylinder on top of a hot plate. Temperature was also monitored via a thermocouple placed on the surface of the coating in the immediate vicinity of the holiday. In this case, the actual temperature of the panel, and therefore the coating, was as much as 30° C. higher than the nominal 60° C. of the salt solution.

After 24 hours of exposure, the degree of disbondment was determined by making radial cuts in the coating (emanating from the holiday) and noting the (average) maximum diameter of delaminated area (i.e., where the coating no longer adhered to the steel panel). Results of this testing are reported herein in terms of the maximum diameter expressed in 32th of an inch. Thus, for example, a rating of 8 corresponds to 8/32 inch and is the original diameter of the holiday; a rating of >64 corresponds to >2 inches and represents complete failure in this test method since the salt solution generally leaked from the cylinder at such large disbondment areas.

Examples 1–5

Tin-cured compositions (i) of the present invention were prepared as follows. One hundred parts of FLUID III was thoroughly mixed with FLUID IV and trimethylsiloxy endblocked polydimethylsiloxane having a viscosity of 1,000 cS, as indicated in Table 1, below. This mixture was diluted with heptane solvent and catalyzed with dibutyltin diacetate, the amounts employed also being shown in Table 1. These compositions were cured on steel panels (film thickness was 3–6 mils) and tested for cathodic disbondment at 23° C. according to the above described procedure. After these tests, the panels of Examples 3–5 were further heated at 100° C. for 72 hours to provide additional cure to the coatings. Fresh areas of these samples were subjected to disbondment testing at 60° C. Results of these tests are also presented in Table 1.

TABLE 1

Disbondment Tests of Tin-Cured Compositions (i)

| Component | (Comparative) Example 1 | Example 2 | Example 3 | Example 4 | Example 5 |
|---|---|---|---|---|---|
| FLUID III | 100 (Parts) | 100 | 100 | 100 | 100 |
| FLUID IV | 340 | 340 | 340 | 340 | 340 |
| Heptane | 65 | 65 | 300 | 300 | 300 |
| 1,000 cS PDMS* | — | 3 | 3.3 | 3.3 | 3.3 |
| DBTDA | 13 | 13 | 7 | 14 | 28 |
| Cathodic Disbondment: | | | | | |
| at 23° C. | 44 | 26 | 19 | 22 | 26 |
| at 60° C. | — | — | 16 | 14 | 14 |

*Trimethylsiloxy endblocked polydimethylsiloxane having a viscosity of 1,000 cS.

It can be seen from Table 1 that the compositions of the present invention show significant improvement in disbondment relative to (Comparative) Example 1.

Examples 6-12

The procedures of Examples 2-5 were repeated, wherein 60 parts of FLUID III, 200 parts of FLUID IV, 200 parts of heptane, 4 parts of DBTDA and 2.5 parts of a trimethylsiloxy endblocked polydimethylsiloxane having the viscosity indicated in Table 2, were thoroughly mixed to form coating compositions. These were again coated onto steel panels, cured, and tested for disbondment at 23° C., the results being shown in Table 2, below. Fresh areas of the panels were then subjected to disbondment testing at 60° C. without any additional curing.

TABLE 2

Disbondment Testing of Tin-Cured Compositions (i)

| | (Comparative) Example 6 | Ex. 7 | Ex. 8 | Ex. 9 | Ex. 10 | Ex. 11 | Ex. 12 |
|---|---|---|---|---|---|---|---|
| Viscosity of Trimethylsiloxy Endblocked Polydimethylsiloxane Component (cS) | None | 5 | 350 | 1,000 | 10,000 | 30,000 | 300,000 |
| Cathodic Disbondment: | | | | | | | |
| at 23° C. | 42 | 14 | 12 | 12 | 16 | 12 | 11 |
| at 60° C. | 56 | 22 | 26 | 17 | 23 | 30 | 24 |

Again, from Table 2, it is evident that the compositions of the present invention are superior to similar compositions which do not include the trimethylsiloxy endblocked polydimethylsiloxane (i.e., Comparative Example 6).

Examples 13-17

Platinum-cured compositions (ii) of the present invention were prepared by mixing the components indicated in Table 3, below. These compositions were coated onto stell panels, cured, and tested for disbondment as described above. The 60° C. disbondment results shown in Table 3 were obtained after the same panels were subjected to an additional cure of 100° C. for 72 hours.

TABLE 3

Disbondment Tests of Platinum-Cured Compositions (ii)

| Component | (Comparative) Example 13 | Example 14 | Example 15 | Example 16 | Example 17 |
|---|---|---|---|---|---|
| FLUID III | 50 | 50 | 50 | 50 | 50 |
| FLUID V | 100 | 100 | 100 | 100 | 100 |
| Methyl Butynol | 0.15 | 0.15 | 0.15 | 0.15 | 0.15 |
| FLUID VI | 1.5 | 1.5 | 1.5 | 1.5 | 1.5 |
| Heptane | 30 | 30 | 20 | 20 | 20 |
| 1,000 cS PDMS* | — | 2 | 1.5 | 1.5 | 1.5 |
| PT | 1.4 | 1.4 | 0.05 | 0.1 | 0.2 |
| Cathodic Disbondment: | | | | | |
| at 23° C. | 64 | 22 | 26 | 21 | 22 |
| at 60° C. | — | — | 15 | 16 | 12 |

*Trimethylsiloxy endblocked polydimethylsiloxane having a viscosity of 1,000 cS.

Again it can be seen that these platinum-cured compositions containing the trimethylsiloxy endblocked polydimethylsiloxane show less disbondment area than (Comparative) Example 13.

Examples 18-24

The procedures of Examples 13-17 were repeated wherein 50 parts of FLUID III, 100 parts of FLUID V, 20 parts of heptane, 0.15 part of methyl butynol, 1.5 parts of FLUID VI, 1 part of PT and 3 parts of a trimethylsiloxy endblocked polydimethylsiloxane having the viscosity indicated in Table 4, were thoroughly mixed to form coating compositions. These were again coated onto steel panels, cured, and tested for disbondment at 23° C., the results being shown in Table 4, below. The panels were then subjected to disbondment testing at 60° C. without any additional curing.

TABLE 4

Disbondment Testing of Platinum-Cured Compositions (ii)

| | (Comparative) Example 18 | Ex. 19 | Ex. 20 | Ex. 21 | Ex. 22 | Ex. 23 | Ex. 24 |
|---|---|---|---|---|---|---|---|
| Viscosity of Trimethylsiloxy Endblocked Polydimethylsiloxane Component (cS) | None | 5 | 350 | 1,000 | 10,000 | 30,000 | 300,000 |
| Cathodic Disbondment: | | | | | | | |
| at 23° C. | 42 | 15 | 16 | 14 | 14 | 14 | 14 |
| at 60° C. | 56 | 23 | 19 | 24 | 22 | 26 | 24 |

Examples 25-29

Compositions identical to those of Examples 18-24 were prepared with the exception that the trimethylsiloxy endblocked polydimethylsiloxane used had a viscosity of 1,000 cS and its amount was varied as indicated in Table 5, below. These compositions were again coated onto steel panels, cured, and tested for disbondment at 23° C. The panels were then subjected to disbondment testing at 60° C. without any additional curing, the results in each case being shown in Table 5, wherein (Comparative) Example 18 is again included.

TABLE 5
Disbondment Testing of Platinum-Cured Compositions (ii)

|  | (Comparative) Example 18 | Ex. 25 | Ex. 26 | Ex. 27 | Ex. 28 | Ex. 29 |
|---|---|---|---|---|---|---|
| Parts of Trimethylsiloxy Endblocked Polydimethylsiloxane Component | None | 1 | 3 | 5 | 10 | 20 |
| Cathodic Disbondment: |  |  |  |  |  |  |
| at 23° C. | 42 | 20 | 18 | 17 | 19 | 19 |
| at 60° C. | 56 | 28 | 28 | 24 | 20 | 26 |

Examples 30–33

Tin-cured compositions (i) and platinum-cured compositions (ii) of the present invention were prepared and tested as in the above examples with the exception that component (A) of the present invention consisted essentially of a room temperature blend of FLUID I (i.e., ingredient (a) of the present invention) and FLUID II (i.e., ingredient (b) of the present invention). These compositions, and corresponding examples, are shown in Table 6.

TABLE 6
Disbondment Tests of Tin-Cured Compositions (i) and Platinum-Cured Compositions (ii) Wherein Component (A) Was a Room Temperature Blend of Ingredients (a) and (b) of the Present Invention

| Component | (Comparative) Example 30 | Example 31 | (Comparative) Example 32 | Example 33 |
|---|---|---|---|---|
| FLUID I | 35.6 (Parts) | 35.6 | 42.7 | 42.7 |
| FLUID II | 25 | 25 | 30 | 30 |
| FLUID IV | — | — | 200 | 200 |
| FLUID V | 100 | 100 | — | — |
| FLUID VI | 1.5 | 1.5 | — | — |
| Methyl Butynol | 0.15 | 0.15 | — | — |
| Heptane | 10 | 10 | 200 | 200 |
| PT | 1 | 1 | — | — |
| DBTDA | — | — | 4 | 4 |
| 10,000 cS PDMS* | — | 3 | — | 2.4 |
| Cathodic Disbondment: |  |  |  |  |
| at 23° C. | 41 | 23 | 56 | 11 |
| at 60° C. | 40 | 52 | 60 | 28 |

*Trimethylsiloxy endblocked polydimethylsiloxane having a viscosity of 10,000 cS.

It can be seen from Table 6 that the compositions of the present invention wherein component (A) is a room temperature blend of ingredients (a) and (b), described above, are again superior to similar compositions which do not contain the trimethylsiloxy endblocked polydimethylsiloxane. It will be noted, however, that the cathodic disbondment results at 60° C. were not as good as those obtained above, wherein component (A) was the reaction product of ingredients (a) and (b).

We claim:

1. In a method for the cathodic protection of a metal object, wherein said metal object is maintained at a negative electrical potential relative to an electrically conductive environment by a current source means, the improvement comprising coating at least one surface of said metal object with a silicone composition selected from a composition (i) comprising (A) a liquid copolymeric organopolysiloxane which is selected from a reaction product or a blend of (a) a resinous copolymeric siloxane consisting essentially of $R_3SiO_{\frac{1}{2}}$ siloxane units and $SiO_{4/2}$ siloxane units wherein the ratio of said $R_3SiO_{\frac{1}{2}}$ units to said $SiO_{4/2}$ units has a value of 0.6:1 to 0.9:1 and each R is independently selected from alkyl, aryl, arylalkyl, cycloaliphatic or haloalkyl radicals and (b) a liquid organohydrogenpolysiloxane;

(B) a diorganopolysiloxane having the average formula

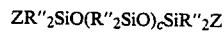

$$ZR''_2SiO(R''_2SiO)_cSiR''_2Z$$

wherein Z is selected from a silicon-bonded hydroxyl radical or an R" radical, R" is a monovalent hydrocarbon radical, with the proviso that at least two R" radicals are vinyl radicals when Z is R", and c has an average value sufficient to provide a viscosity of about 10 to 300,000 Poise at 25° C. for the diorganopolysiloxane;

(C) a triorganosiloxy endblocked diorganopolysiloxane having the general formula $R_3SiO(R_2SiO)_dSiR_3$, wherein R has its previously defined meaning and d has an average value sufficient to provide a viscosity of about 0.01 to 10,000 Poise at 25° C. for the triorganosiloxy endblocked diorganopolysiloxane; and (D) a cure agent, or a composition (ii) comprising (A) said liquid copolymeric organopolysiloxane;

(B) said diorganopolysiloxane;

(C) said triorganosiloxy endblocked diorganopolysiloxane;

(E) an organosilicon resin consisting essentially of $Me_2ViSiO_{\frac{1}{2}}$ units, $Me_3SiO_{\frac{1}{2}}$ units and $SiO_{4/2}$ units, wherein Me denotes a methyl radical and Vi denotes a vinyl radical, said units being in a ratio of $Me_2ViSiO_{\frac{1}{2}}$ units to $Me_3SiO_{\frac{1}{2}}$ units to $SiO_{4/2}$ units of from 0.10:0.6:1 to 0.25:0.9:1; and (F) a hydrosilylation catalyst, and curing said silicone composition to a non-flowing state.

2. The method of claim 1, wherein R and R" are methyl radicals.

3. The method of claim 2, wherein said ratio of $R_3SiO_{\frac{1}{2}}$ units to $SiO_{4/2}$ units of component (A) has a value of about 0.75, said organohydrogenpolysiloxane is represented by the formula

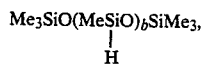

$$Me_3SiO(\underset{\underset{H}{|}}{MeSiO})_bSiMe_3,$$

in which Me denotes the methyl radical and b has an average value of 30 to 70, approximately equal parts by weight of said resinous copolymeric siloxane is reacted with said liquid organohydrogenpolysiloxane to form said liquid copolymeric organopolysiloxane and wherein said triorganosiloxy endblocked diorganopolysiloxane (C) has a viscosity of about 0.5 to 300 Poise at 25° C.

4. The method of claim 3, wherein said silicone composition is composition (i) and Z is the hydroxyl radical.

5. The method of claim 4, wherein said diorganopolysiloxane (B) has a viscosity of about 200,000 Poise at 25° C.

6. The method of claim 3, wherein said silicone composition is composition (ii) and Z is the vinyl radical.

7. The method of claim 6, wherein said diorganopolysiloxane (B) has a viscosity of about 550 Poise at 25° C.

8. The method of claim 1, wherein said metal is selected from iron or steel.

9. The method of claim 3, wherein said metal is selected from iron or steel.

10. A silicone composition comprising:
(A) from about 5 to 300 parts by weight of a liquid copolymeric organopolysiloxane which is a reaction product of (a) a resinous copolymeric siloxane consisting essentially of $R_3SiO_{\frac{1}{2}}$ siloxane units and $SiO_{4/2}$ siloxane units wherein the ratio of said $R_3SiO_{\frac{1}{2}}$ units to said $SiO_{4/2}$ units has a value of 0.6:1 to 0.9:1 and each R is independently selected from alkyl, aryl, arylalkyl, cycloaliphatic or haloalkyl radicals and (b) a liquid organohydrogenpolysiloxane;
(B) about 100 parts by weight of a diorganopolysiloxane having the average formula

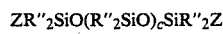

wherein Z is selected from a silicon-bonded hydroxyl radical or an R" radical, R" is a monovalent hydrocarbon radical, with the proviso that at least two R" radicals are vinyl radicals when Z is R", and c has an average value sufficient to provide a viscosity of about 10 to 300,000 Poise at 25° C. for the diorganopolysiloxane;
(C) from about 1 to 100 parts by weight of a triorganosiloxy endblocked diorganopolysiloxane having the general formula $R_3SiO(R_2SiO)_dSiR_3$, wherein R has its previously defined meaning and d has an average value sufficient to provide a viscosity of about 0.01 to 10,000 Poise at 25° C. for the triorganosiloxy endblocked diorganopolysiloxane; and
(D) sufficient cure agent to convert said silicone composition to a non-flowing state.

11. The composition of claim 10, wherein R and R" are methyl radicals.

12. The composition of claim 11, wherein Z is a hydroxyl radical.

13. The composition of claim 12, wherein said ratio of $R_3SiO_{\frac{1}{2}}$ units to $SiO_{4/2}$ units has a value of about 0.75 and wherein said triorganosiloxy endblocked diorganopolysiloxane (C) has a viscosity of about 0.5 to 300 Poise at 25° C.

14. The composition of claim 13, wherein said organohydrogenpolysiloxane (b) is represented by the formula

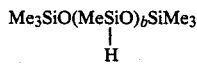

in which Me denotes the methyl radical and b has an average value of 30 to 70.

15. The composition of claim 14, wherein approximately equal parts by weight of said resinous copolymeric siloxane (a) is reacted with said liquid organohydrogenpolysiloxane (b) to form said liquid copolymeric organopolysiloxane.

16. The compositon of claim 15, wherein said organopolysiloxane (B) has a viscosity of about 200,000 Poise at 25° C.

17. A silicone composition comprising:
(A) from about 5 to 300 parts by weight of a liquid copolymeric organopolysiloxane which is a reaction product of (a) a resinous copolymeric siloxane consisting essentially of $R_3SiO_{\frac{1}{2}}$ siloxane units and $SiO_{4/2}$ siloxane units wherein the ratio of said $R_3SiO_{\frac{1}{2}}$ units to said $SiO_{4/2}$ units has a value of 0.6:1 to 0.9:1 and each R is independently selected from alkyl, aryl, arylalkyl, cycloaliphatic or haloalkyl radicals and (b) a liquid organohydrogenpolysiloxane;
(B) about 100 parts by weight of a diorganopolysiloxane having the average formula

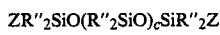

wherein Z is selected from a silicon-bonded hydroxyl radical or an R" radical, R" is a monovalent hydrocarbon radical, with the proviso that at least two R" radicals are vinyl radicals when Z is R", and c has an average value sufficient to provide a viscosity of about 10 to 300,000 Poise at 25° C. for the diorganopolysiloxane;
(C) from about 1 to 100 parts by weight of a triorganosiloxy endblocked diorganopolysiloxane having the general formula $R_3SiO(R_2SiO)_dSiR_3$, wherein R has its previously defined meaning and d has an average value sufficient to provide a viscosity of about 0.01 to 10,000 Poise at 25° C. for the triorganosiloxy endblocked diorganopolysiloxane;
(E) from about 9 to 36 pats by weight of an organosilicon resin consisting essentially of $Me_2ViSiO_{\frac{1}{2}}$ units, $Me_3SiO_{\frac{1}{2}}$ units and $SiO_{4/2}$ units, wherein Me denotes a methyl radical and Vi denotes a vinyl radical, said units being in a ratio of $Me_2ViSiO_{\frac{1}{2}}$ units to $Me_3SiO_{\frac{1}{2}}$ units to $SiO_{4/2}$ units of from 0.10:0.6:1 to 0.25:0.9:1; and
(F) sufficient hydrosilylation catalyst to convert said silicone composition to a non-flowing state.

18. The composition of claim 17, wherein R and R" are methyl radicals.

19. The composition of claim 18, wherein Z is a vinyl radical.

20. The composition of claim 19, wherein said ratio of $R_3SiO_{\frac{1}{2}}$ to $SiO_{4/2}$ units has a value of about 0.75 and wherein said triorganosiloxy endblocked diorganopolysiloxane (C) has a viscosity of about 0.5 to 300 Poise at 25° C.

21. The composition of claim 20, wherein said organohydrogenpolysiloxane (b) is represented by the formula

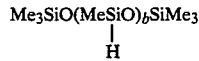

in which Me denotes the methyl radical and b has an average value of 30 to 70.

22. The composition of claim 21, wherein approximately equal parts by weight of said resinous copolymeric siloxane (a) is reacted with said liquid organohydrogenpolysiloxane (b) to form said liquid copolymeric organopolysiloxane.

23. The composition of claim 22, wherein said ratio of $Me_2ViSiO_{\frac{1}{2}}$ units to $Me_3SiO_{\frac{1}{2}}$ units to $SiO_{4/2}$ units is about 0.15:0.6:1.

24. The composition of claim 23, wherein said organopolysiloxane (B) has a viscosity of about 550 Poise at 25° C.

25. A silicone composition comprising:
(A) from about 5 to 300 parts by weight of a blend of
  (a) a resinous copolymeric siloxane consisting essentially of $R_3SiO_{\frac{1}{2}}$ siloxane units and $SiO_{4/2}$ siloxane units wherein the ratio of said $R_3SiO_{\frac{1}{2}}$ units to said $SiO_{4/2}$ units has a value of 0.6:1 to 0.9:1 and each R is independently selected from alkyl, aryl, arylalkyl, cycloaliphatic or haloalkyl radicals and
  (b) a liquid organohydrogenpolysiloxane;
(B) about 100 parts by weight of a diorganopolysiloxane having the average formula $$ZR''_2SiO(R''_2SiO)_cSiR''_2Z$$

wherein Z is selected from a silicon-bonded hydroxyl radical or an R'' radical, R'' is a monovalent hydrocarbon radical, with the proviso that at least two R'' radicals are vinyl radicals when Z is R'', and c has an average value sufficient to provide a viscosity of about 10 to 300,000 Poise at 25° C. for the diorganopolysiloxane;
(C) from about 1 to 100 parts by weight of a triorganosiloxy endblocked diorganopolysiloxane having the general formula $R_3SiO(R_2SiO)_dSiR_3$, wherein R has its previously defined meaning and d has an average value sufficient to provide a viscosity of about 0.01 to 10,000 Poise at 25° C. for the triorganosiloxy endblocked diorganopolysiloxane; and
(D) sufficient cure agent to convert said silicone composition to a non-flowing state.

26. The composition of claim 25, wherein R and R'' are methyl radicals.

27. The composition of claim 26, wherein Z is a hydroxyl radical.

28. The composition of claim 27, wherein said ratio of $R_3SiO_{\frac{1}{2}}$ units to $SiO_{4/2}$ units has a value of about 0.75 and wherein said triorganosiloxy endblocked diorganopolysiloxane (C) has a viscosity of about 0.5 to 300 Poise at 25° C.

29. The composition of claim 28, wherein said organohydrogenpolysiloxane (b) is represented by the formula $$\underset{\underset{H}{|}}{Me_3SiO(MeSiO)_b SiMe_3}$$

in which Me denotes the methyl radical and b has an average value of 30 to 70.

30. The composition of claim 29, wherein approximately equal parts by weight of said resinous copolymeric siloxane (a) is blended with said liquid organohydrogenpolysiloxane (b) to form said component (A).

31. The composition of claim 30, wherein said organopolysiloxane (B) has a viscosity of about 200,000 Poise at 25° C.

32. A silicone composition comprising:
(A) from about 5 to 300 parts by weight of a blend of
  (a) a resinous copolymeric siloxane consisting essentially of $R_3SiO_{\frac{1}{2}}$ siloxane units and $SiO_{4/2}$ siloxane units wherein the ratio of said $R_3SiO_{\frac{1}{2}}$ units to said $SiO_{4/2}$ units has a value of 0.6:1 to 0.9:1 and each R is independently selected from alkyl, aryl, arylalkyl, cycloaliphatic or haloalkyl radicals and
  (b) a liquid organohydrogenpolysiloxane;
(B) about 100 parts by weight of a diorganopolysiloxane having the average formula $$ZR''_2SiO(R''_2SiO)_cSiR''_2Z$$

wherein Z is selected from a silicon-bonded hydroxyl radical or an R'' radical, R'' is a monovalent hydrocarbon radical, with the proviso that at least two R'' radicals are vinyl radicals when Z is R'', and c has an average value sufficient to provide a viscosity of about 10 to 300,000 Poise at 25° C. for the diorganopolysiloxane;
(C) from about 1 to 100 parts by weight of a triorganosiloxy endblocked diorganopolysiloxane having the general formula $R_3SiO(R_2SiO)_dSiR_3$, wherein R has its previously defined meaning and d has an average value sufficient to provide a viscosity of about 0.01 to 10,000 Poise at 25° C. for the triorganosiloxy endblocked diorganopolysiloxane;
(E) from about 9 to 36 parts by weight of an organosilicon resin consisting essentially of $Me_2ViSiO_{\frac{1}{2}}$ units, $Me_3SiO_{\frac{1}{2}}$ units and $SiO_{4/2}$ units, wherein Me denotes a methyl radical and Vi denotes a vinyl radical, said units being in a ratio of $Me_2ViSiO_{\frac{1}{2}}$ units to $Me_3SiO_{\frac{1}{2}}$ units to $SiO_{4/2}$ units of from 0.10:0.6:1 to 0.25:0.9:1; and
(F) sufficient hydrosilylation catalyst to convert said silicone composition to a non-flowing state.

33. The composition of claim 32, wherein R and R'' are methyl radicals.

34. The composition of claim 33, wherein Z is a vinyl radical.

35. The composition of claim 34, wherein said ratio of $R_3SiO_{\frac{1}{2}}$ units to $SiO_{4/2}$ units has a value of about 0.75 and wherein said triorganosiloxy endblocked diorganopolysiloxane (C) has a viscosity of about 0.5 to 300 Poise at 25° C.

36. The composition of claim 35, wherein said organohydrogenpolysiloxane (b) is represented by the formula $$\underset{\underset{H}{|}}{Me_3SiO(MeSiO)_b SiMe_3}$$

in which Me denotes the methyl radical and b has an average value of 30 to 70.

37. The composition of claim 36, wherein approximately equal parts by weight of said resinous copolymeric siloxane (a) are blended with said liquid organohydrogenpolysiloxane (b) to form said component (A).

38. The composition of claim 37, wherein said ratio of $Me_2ViSiO_{\frac{1}{2}}$ units to $Me_3SiO_{\frac{1}{2}}$ units to $SiO_{4/2}$ units is about 0.15:0.6:1.

39. The composition of claim 38, wherein said organopolysiloxane (B) has a viscosity of about 550 Poise at 25° C.

40. A metal substrate bearing the cured composition of claim 10.

41. A metal substrate bearing the cured composition of claim 12.

42. A metal substrate bearing the cured composition of claim 17.

43. A metal substrate bearing the cured composition of claim 19.

44. A metal substrate bearing the cured composition of claim 25.

45. A metal substrate bearing the cured composition of claim 27.

46. A metal substrate bearing the cured composition of claim 32.

47. A metal substrate bearing the cured composition of claim 34.

* * * * *